3,284,517
HYDROGENATION OF ALPHA,BETA-UNSATURATED ALDEHYDES TO ALPHA,BETA-UNSATURATED ALCOHOLS
Paul N. Rylander, Newark, and Nathan G. Himelstein, Hillside, N.J., assignors to Engelhard Industries, Inc., Newark, N.J., a corporation of Delaware
No Drawing. Filed Sept. 11, 1963, Ser. No. 308,094
10 Claims. (Cl. 260—638)

This invention relates to the production of unsaturated alcohols, and more particularly to a process for the hydrogenation of alpha,beta-olefinically unsaturated aldehydes to produce the corresponding unsaturated alcohols.

In the past, efforts to produce unsaturated alcohols by the catalytic hydrogenatoin of the corresponding alpha, beta-olefinically unsaturated aldehydes have in general not been successful. The olefinic bond was reduced to the exclusion of the carbonyl double bond, for instance with palladium, platinum, rhodium or ruthenium as catalyst on a variety of supports, to produce instead the saturated aldehyde.

In accordance with the present invention, the carbonyl group of an alpha,beta-olefinically unsaturated aldehyde, for instance crotonaldehyde, is selectively hydrogenated to produce the corresponding unsaturated alcohol in high yield. The process involves contacting the alpha,beta-olefinically unsaturated aldehyde in the presence of hydrogen with a supported platinum catalyst in the presence of silver and iron having a maximum valence of two as promoters. The silver and iron may be distributed in the aldehyde as silver or ferrous salts, or supported on the catalyst support together with the platinum as metallic iron and silver. As a result of such contacting, the carbonyl group is hydrogenated to the exclusion or substantial exclusion of the olefinic double bond to produce the corresponding olefinically unsaturated alcohol. The product unsaturated alcohol is then recovered from the reaction mass. The process is especially meritorious in producing the olefinically unsaturated alcohol, for instance crotonyl alcohol, in very high yields as high as 98% and higher as determined by infrared spectral analysis of the product.

More particularly, the alpha,beta-olefinically unsaturated aldehyde is hydrogenated in liquid phase and preferably while in admixture with an organic liquid diluent. Exemplary of such diluents are lower alkanols, e.g. ethanol, propanol, methanol, isopropanol, and n-butanol. The diluent is preferably one in which the unsaturated aldehyde is soluble or partially soluble. The aldehyde is combined with the diluent in a weight ratio of typically 1–50:1 of the organic liquid diluent to the aldehyde respectively. The supported platinum catalyst is then added to the aldehyde-diluent admixture and the silver and iron promoters also added to the admixture as salts. Alternatively the silver and iron promoters can be incorporated into the catalyst as metallic silver and metallic iron and/or ferrous oxide during the catalyst preparation and added to the aldehyde-diluent mixture in the supported catalyst. Hydrogen gas is then passed into the liquid aldehyde-diluent admixture in at least the stoichiometric quantity to react with the unsaturated aldehyde to reduce the carbonyl double bond to produce the corresponding unsaturated alcohol. The selective hydrogenation of the carbonyl double bond of the alpha,beta-olefinically unsaturated aldehyde, crotonaldehyde, to produce the corresponding unsaturated alcohol, crotonyl alcohol, proceeds according to the following equation:

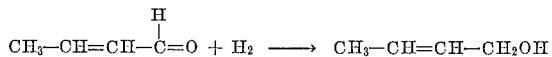

The selective hydrogenation of the carbonyl double bond of cinnamaldehyde, also an alpha,beta-olefinically unsaturated alcohol, takes place in accordance with the following equation:

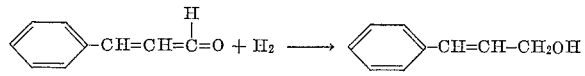

The unsaturated alcohol is recovered from the reaction mass by separating the catalyst from the liquid, for instance by filtration, and separating the diluent by distillation or evaporation. The remaining unsaturated alcohol is preferably then purified by recrystallization when a solid and rectification when a liquid.

The silver salts are those of inorganic or organic acids, for instance silver nitrate, silver chlorate, silver acetate and silver nitrite and silver perchlorate. The iron salts are ferrous salts of inorganic or organic acids, for instance ferrous chloride ferrous sulfate, ferrous acetate, ferrous nitrate and ferrous bromide. Ferric salts should be avoided as the unsaturated alcohol is not obtained with their use. The silver and iron-promoted supported platinum catalyst with the silver and iron deposited on the support together with the platinum can be prepared by mixing a soluble compound of platinum, for instance chloroplatinic acid, and and a soluble salt of silver, for instance silver nitrate, and of iron, for instance ferrous chloride, together with a solid catalyst support, for instance, carbon in a water suspension and agitating the mixture under hydrogen. The carbon is then filtered off, washed with water, and dried in an oven at 100° C.

The hydrogenation can be carried out at room temperature and temperature as high as about 100° C. can be employed. Preferred temperature for the hydrogenation is room temperature to about 50° C. Pressures between 0 and about 1500 p.s.i.g. may be employed. The hydrogenation can be carried out in either batchwise or continuous operation.

Concentration of platinum metal in the supported catalyst may range, by weight, from about 0.1%–30%, preferably from about 3%–5% (based on catalytic metal plus support). The silver and iron promoters are utilized broadly within an atomic ratio range of about .001–1:1 of Ag to Pt respectively and about .01–10:1 of Fe to Pt respectively. Although quantities of silver and iron greater than the 1:1 and 10:1 upper limits of Ag to Pt and Fe to Pt respectively can be utilized, much greater quantities of silver and iron than such upper limits are unsatisfactory because causing deactivation of the catalyst. Quantities of silver and iron much below the about .001:1 and .01:1 lower limits of Ag to Pt and Fe to Pt respectively should be avoided, as the desired promotional effect will not be attained with these smaller amounts. The atomic ratio of Ag to Pt of about .001:1 respectively may be provided, for instance when adding the Ag as $AgNO_3$ and employing a Pt on carbon catalyst having a 5% Pt content, by adding 0.00435 mg. $AgNO_3$ per 100 mg. of 5% Pt on carbon present. The atomic ratio of Ag to Pt of about 1:1 may be provided by adding 4.35 mg. $AgNO_3$ per 100 mg. of 5% Pt on carbon. Further, the atomic ratio of Fe to Pt of about .01:1 may be provided by adding .033 mg. $FeCl_2$ per 100 mg. of 5% Pt on carbon, and the atomic ratio of Fe to Pt of about 10:1 may be provided by adding 33 mg. $FeCl_2$ per 100 mg. of 5% Pt on carbon. The preferred amounts of Ag and Fe for use herein are within the range of about .01–0.2:1 of Ag to Pt respectively and about .1–6:1 of Fe to Pt respectively. The catalyst support is preferably carbon and calcium carbonate. Exemplary of the other solid catalysts supports that may be used are kieselguhr and calcium sulfate. The supported catalyst may be in the form of pellets, extruded shapes, granules, etc.

The alpha,beta-olefinically unsaturated aldehydes hydrogenated in accordance with this invention have a structure that can be represented by the general formula:

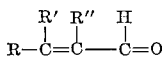

wherein R, R' and R'' represent hydrogen atoms or alkyl, aryl, alkaryl, aralkyl or alkoxy radicals, and can be the same or different. Exemplary of the various radicals are a 1–12 or more carbon alkyl; phenyl, naphthyl, ethylphenyl, propylphenyl; benzyl, phenethyl or phenpropyl; and methoxy and propoxy. Functional groups such as hydroxy, carboxy, amido and ester groups can also be present in the aldehyde molecule without interfering with the hydrogenation to produce the saturated alcohol. Alpha, beta-olefinically unsaturated aldehydes included within the general formula above stated are, for example, crotonaldehyde, acrylic aldehyde, cinnamaldehyde, tiglic aldehyde, $\beta$-methyl-croton-aldehyde, 2-methyl-2-pentenal, 2-hexenal, 2-ethyl-2-hexenal, 2-phenyl-2-pentenal,$\alpha$-, $\beta$- and $\gamma$-phenyl-crotonaldehyde,$\alpha$-, $\beta$- and $\gamma$-benzylcrotonaldehyde,$\alpha$-, $\beta$- and $\gamma$-p-tolylcrotonaldehyde, and $\alpha$-, $\beta$- and $\gamma$-methoxycrotonaldehyde.

The invention will be more fully understood by reference to the following comparative test data set forth in Table I. The test runs were separately carried out by admixing at room temperature the crotonaldehyde in runs 1–5 and 7–11 and cinnamaldehyde in run 6 with ethanol as diluent in a hydrogenation reactor. 13 ml. of crotonaldehyde were admixed with 50 ml. ethanol in test runs 1–3, 5 and 7–11, 26 ml. of crotonaldehyde admixed with 100 ml. ethanol in test run 4, and 13 ml. of cinnamaldehyde with 50 ml. of ethanol in test run 6. The supported catalyst was then added in the amount of 2000 mg. to the admixture of substrate and diluent, except that in test run 4 the platinum on carbon catalyst was added in the amount of 200 mg. The promoter was then added to the liquid reaction mixture. The system was then flushed several times with hydrogen, agitation was begun, hydrogen gas passed into the reactor, and the reduction continued until one molecular equivalent of hydrogen was absorbed. After cessation of the reaction the product was identified by infrared analysis.

Test runs were also conducted under similar conditions as in the Table I test runs with supported palladium, rhodium or ruthenium as catalyst and with additives such as iron, zinc, gold, silver, tin, copper, nickel and lead, singly or in combination, as promoters. However, in every test run, the saturated aldehyde was the only hydrogenation product as identified by infrared analysis.

The crotonyl alcohol prepared by this invention has utility for the production of copolymers with vinyl acetate or styrene, and also as an intermediate for synthesis of other organic compounds.

The cinnamyl alcohol is useful in the perfume industry for its high fixation values in perfume compositions containing hyacinth, jasmine, lilac, etc. Another major use is in the production of esters which are also valuable as fixatives for use in perfumes compositions.

What is claimed is:

1. A process for the production of an olefinically unsaturated alcohol which comprises contacting an alpha, beta-olefinically unsaturated aldehyde dispersed in an organic liquid diluent and in the presence of hydrogen, with a supported platinum catalyst in the presence of silver and iron having a maximum valence of two as promoters to convert the olefinically unsaturated aldehyde to the corresponding unsaturated alcohol.

2. The process of claim 1 wherein the silver and iron promoters are dispersed in the liquid diluent as a silver salt and a ferrous salt respectively.

3. The process of claim 2 wherein the silver salt is $AgNO_3$.

4. The process of claim 2 wherein the ferrous salt is $FeCl_2$.

5. The process of claim 2 wherein the olefinically unsaturated aldehyde is crotonaldehyde.

6. The process of claim 1 wherein the silver and iron are utilized in proportions within the atomic ratio range of about .01–.2:1 of Ag to Pt respectively and about .1–6:1 of Fe to Pt respectively.

7. The process of claim 1 wherein the hydrogenation is carried out at a temperature in the range of room temperature to about 100° C.

8. The process of claim 1 wherein the catalyst support is carbon.

*Table I*

| Test Run | Catalyst | Promoter Additives Moles | Moles | Substrate | Diluent | Product | Remarks |
| --- | --- | --- | --- | --- | --- | --- | --- |
| 1 | 5% Pt/C | 0.0002 $FeCl_2$ | 0.00003 $AgNO_3$ | Crotonaldehyde | Ethanol | 2-butene-1-ol | Yield of 2-butene-1-ol was 99.5%. |
| 2 | 5% Pt/C | 0.0002 $AgNO_3$ | | do | do | Butyraldehyde | |
| 3 | 5% Pt/C | 0.0002 $FeCl_2$ | | do | do | do | |
| 4 | 5% Pt/C | 0.0002 $FeCl_2$ | 0.00002 $Zn(OOCCH_3)_2$ | do | do | | No hydrogenation. Catalyst ineffective. |
| 5 | 5% Pt/C | 0.0002 $FeCl_2$ | 0.00003 $SnCl_2$ | do | do | Butyraldehyde | |
| 6 | 5% Pt/C | 0.0002 $FeCl_2$ | 0.00003 $AgNO_3$ | Cinnamaldehyde | do | Cinnamyl alcohol | Yield of cinnamyl alcohol was 99%. |
| 7 | 5% Pt/C | 0.0002 $FeCl_2$ | 0.00003 $RuCl_3$ | Crotonaldehyde | do | Butyraldehyde | |
| 8 | 5% Pt/C | 0.0002 $FeCl_2$ | 0.00003 $RhCl_3$ | do | do | do | |
| 9 | 5% Rh/C | 0.0002 $FeCl_2$ | 0.00003 $AgNO_3$ | do | do | do | |
| 10 | 5% Ru/C | 0.0002 $FeCl_2$ | 0.00003 $AgNO_3$ | do | do | do | |
| 11 | 5% Pt as PtO on $CaCO_3$. | 0.0002 $FeCl_2$ | 0.00003 $AgNO_3$ | do | do | 2-butene-1-ol | Yield of 2-butene-1-ol was 98.5%. |

The data of Table I evidences that only the combination of the iron and silver salts as promoter together with the supported platinum was effective to catalyze the hydrogenation of crotonaldehyde to the corresponding unsaturated alcohol, 2-butene-1-ol. The presence of the silver salt alone or iron salt alone as promoter resulted in the saturation of the olefinic bond and not the carbonyl double bond as desired, to produce the corresponding saturated aldehyde. Further, it was also essential that the supported catalyst be a supported platinum catalyst as the combination of the iron and silver salts with supported catalysts other than supported platinum catalyst as shown by test runs 9 and 10 of Table I resulted in only the olefinic double bond being hydrogenated to yield butyraldehyde.

9. The process of claim 1 wherein the catalyst support is calcium carbonate.

10. The process of claim 1 wherein the silver and iron promoters are present on the support together with the platinum, the silver, iron and platinum having been deposited on the support during catalyst preparation.

References Cited by the Examiner

UNITED STATES PATENTS 2,600,275  6/1952  Smith _____ 260—615

LEON ZITVER, *Primary Examiner.*

J. E. EVANS, *Assistant Examiner.*